Sept. 16, 1947.  G. M. POWELL, 3D., ET AL  2,427,507
METHOD OF PRODUCING SEALED CABLES
Filed April 11, 1944
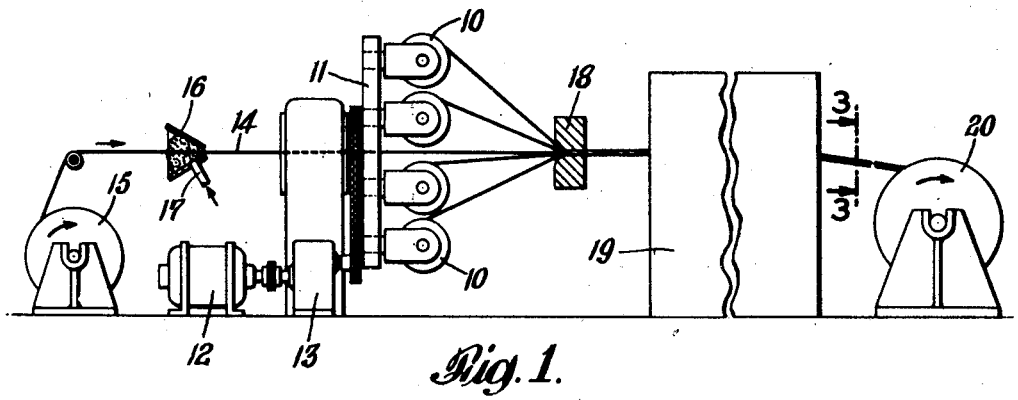
Fig. 1.
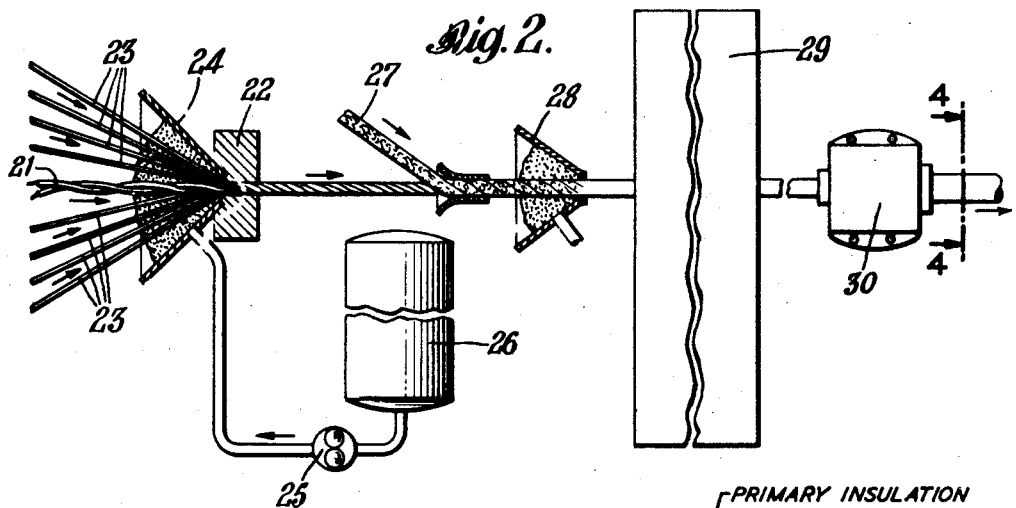
Fig. 2.
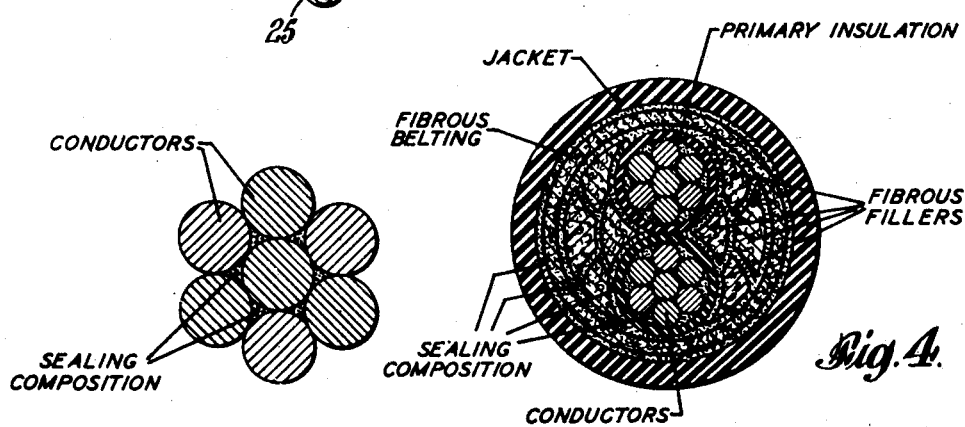
Fig. 3.
Fig. 4.
INVENTORS
GEORGE M. POWELL, 3RD
JOSEPH E. BRISTER
BY
ATTORNEY Patented Sept. 16, 1947

2,427,507

UNITED STATES PATENT OFFICE 2,427,507

METHOD OF PRODUCING SEALED CABLES

George M. Powell, 3rd, South Charleston, W. Va., and Joseph E. Brister, Summit, N. J., assignors to Carbide and Carbon Chemicals Corporation, a corporation of New York Application April 11, 1944, Serial No. 530,460

1 Claim. (Cl. 57—164)

This invention relates to single and multi-conductor cables and to sealing means and compositions for filling the voids in such cables.

Single and multi-conductor cables are widely employed in merchant marine and naval vessels to carry electrical current to various parts of the ship. In forming such cables, single strands of wire are wound together by means of stranding machines, and the standard conductor thus formed is covered with an insulating material, such as an extruded vinyl resin composition. Such primary insulated conductors may also have a treated fibrous covering to form a composite insulation, and a number of such insulated conductors may be wound together with suitable fibrous fillers, and covered with a jacketing material to form a multi-conductor control cable. In another construction, stranded wire conductors having a suitable primary insulation overlaid with a saturated fibrous wrap or braid are twisted together with fibrous fillers, and later covered with a jacketing material to form a two, three or four conductor power cable. Many other cable constructions are also known.

In all such cables, voids necessarily exist between the wires of the stranded conductors and in the interstices formed between the component interior parts of the cable, irrespective of the tightness of the winding. It has been found that, if a break occurs in a cable by reason of accident or damage and the broken part is wetted or immersed in water, water will travel along the cable through these empty spaces and will damage whole sections of cable which previously were unharmed. When such breaks occur, the travel of water along the cable through these empty spaces to the cable ends, will wet other electrical cables or electrical equipment, and cause short circuits, thus interrupting other vitally needed electrical service which would have continued to operate if not so damaged.

This condition has necessitated a demand for single and multi-conductor cables in which the interstices between the wires, insulated stranded wires, wrapping materials or jacket are filled with a sealing composition. The sealing compositions which have been proposed for this purpose have been unsatisfactory in that they have been lacking in flexibility and cause the cable to be stiffened. This lack of flexibility causes such sealing compositions to lose their effectiveness when the cable containing them is bent or twisted with other cables to form larger cables. Such sealing compositions have included phenolic resins plasticized with waxes and tricresyl phosphate, which have the additional disadvantage that components of the sealing composition, such as the plasticizer, migrate to the plasticized vinyl resins which are customarily employed as the primary insulating material or jacketing material, and reduce the dielectric qualities of these insulating materials, as well as softening them excessively. These sealing compositions require relatively long curing times, and they are difficult to incorporate in the cable.

The object of this invention is to provide a method for sealing the interstices in cables wherein the cable retains its flexibility and contamination of the primary insulation and the jacketing material is avoided. A further object is to provide a sealing composition for use in this process which is initially relatively fluid, but which may be transformed rapidly to a composition which will not drip at 105° C., and which, in this state, will remain flexible at temperatures of 0° C. to —40° C. An additional object is to provide a sealed cable which will not leak when tested with air or water under a pressure of 25 p. s. i. or greater.

According to this invention, sealed cables are provided by filling the interstices in the cable with a suspension in a plasticizer of a finely divided polymeric resin containing vinyl chloride combined in the polymer, hereinafter termed "vinyl chloride resins." These suspensions are prepared by methods hereinafter described. In general, the suspensions or "plastisols" may vary in consistency from easily spreadable pastes to readily pourable fluids. The suspensions may contain pigments, fillers and other ingredients, as hereinafter set forth.

After the interstices in a stranded wire conductor or throughout the cable have been filled with the suspension, the stranded wire conductor or the cable is then heated for a brief period of say two to five minutes at an elevated temperature of about 250° F. to 375° F. The result of the heat treatment is to cause the powdered vinyl resin to swell and be colloidally combined with the plasticizer, and, on cooling, a flexible elastomeric composition is formed. Such elastomeric compositions may have tensile strengths of 500 to 4000 p. s. i., elongations of 100% to 400%, and flex temperatures of 0° C. to —40° C. The suspensions do not shrink, other than as fixed by their cubical coefficient of expansion after such treatment so that all the voids in the cable are filled with a flexible and solid elastomeric composition, and the sealed cable fulfills all the requirements set forth above.

In the accompanying drawings—

Fig. 1 is a diagrammatic illustration of one method of forming a sealed cable.

Fig. 2 is a diagrammatic illustration of another method of forming a sealed cable.

Fig. 3 is a cross section of a sealed cable, taken on the line 3—3 of Fig. 1.

Fig. 4 is a cross section of a sealed cable taken on the line 4—4 of Fig. 2.

The sealing composition may be applied during the forming of stranded wires or during cable making operations. Figure 1 illustrates a method by which the sealing compound may be applied during wire-stranding operations. In wire-stranding, the wires are drawn from spools 10, which are mounted in a cabling head 11, which is rotated by means of the motor 12 through transmission mechanism 13. The center strand 14 passes through the hollow axis of the cabling head from a pay-off reel 15. The suspension may be applied to the center strand by means of a cone 16, through which the wire is drawn. The suspension is pumped to the cone through a pipe 17, and it is held in the cone by its own internal cohesiveness, and by the movement of the strand through the cone. The external strands are twisted around the center strand by the action of the stranding die 18, and by the rotating motion of the cabling head.

The suspension fills all the voids in the stranded wire as shown in Figure 3, representing an enlarged cross-sectional view of seven stranded wires having a sealing composition filling the interstices. However, the stranded wires readily cut through the sealing composition, and are in good electrical contact with one another. The stranded wires pass through the oven 19, where they are heat-treated to cause the plasticizer to solvate the vinyl chloride resin, and the stranded wires are then wound on take-up reel 20. Frequently, such wires are then covered with an extruded insulating composition, and the heat of the extrusion operation may be all that is required to harden the vinyl resin suspension, so that the oven 19 may not be needed. Where a very large number of wires are to be stranded, more than one wire in the combination may be coated with the suspension.

Similar operations are involved in applying the sealing composition to fill the interstices in cabling operations, and such operations are illustrated schematically in Figure 2. A twisted pair of insulated wires 21 having the sealing composition between the stranded wires making up each conductor are fed through the center of the die 22. Fibrous asbestos fillers 23, saturated with a flameproofing compound, such as chlorinated naphthalene, are laid around the central conductors. Just before the die, the conductors and fillers pass through a cone 24 containing the pasty suspension. The suspension is fed to the cone 24 by means of gear pump 25 from a container 26. The suspension will fill the interstices between the conductors and the fillers by the action of the die 22. Some of the sealing composition will also be forced to the outside of the fillers. A wrapping 27 of asbestos impregnated with a flameproof sealing composition is then applied in the conventional manner, and will cause the sealing composition on the outside of said fillers to form a tight seal with said wrapping material. Over the wrapping there may be applied another coating of the sealing composition from the cone 28, if desired. Also, the wrapping itself may be impregnated with the sealing material before it is applied.

The cable then passes through the oven 29, which causes the sealing composition, which has been applied in cones 28 and 24, to become solid after cooling. After leaving the oven, an extruded jacket of suitable material, such as plasticized vinyl chloride resin, is forced over the cable through extrusion head 30. By making the jacketing composition and sealing composition, both composed of vinyl chloride resins and plasticizers, the sealing composition, being thermoplastic, will blend integrally with the jacketing composition during the extrusion operation, and a water-tight seal between the jacket and the interior of the cable will result without reducing the dielectric qualities of the insulating material. An enlarged view of the sealed cable in cross section is shown in Figure 4.

The vinyl chloride resins employed in the making of the suspensions may be copolymers of vinyl chloride with other polymerizable materials, such as vinyl acetate, vinyl propionate, methyl acrylate, butyl acrylate, methyl methacrylate, butyl methacrylate, acrylonitrile, vinylidine chloride and maleate esters, such as dibutyl maleate or the vinyl chloride resins may be delta or gamma polyvinyl chloride. To secure sealing compositions of good physical properties, it is desirable that the vinyl chloride resins be of high molecular weights, as determined by their relative insolubility in certain solvents, such as toluene and butyl acetate. Most of the resins, however, are soluble in cyclic and unsaturated ketones, such as mesityl oxide, isophorone and cyclohexanone. In making the copolymers, vinyl chloride is usually employed in predominant amount.

To obtain suspensions of adequate fluidity, it is essential to start with finely-divided resins. Mechanical methods of sub-division are, in general, not wholly satisfactory because of the limitation on the particle size of the resins obtainable. It is preferable to employ a vinyl chloride resin which is made by the polymerization of the monomeric materials in aqueous emulsion, according to known procedures, for instance, by polymerization at low temperatures of 35° to 40° as disclosed in United States Patent No. 2,068,424. The resin particles produced by emulsion polymerization are extremely minute, and the agglomerates produced by coagulation of the resinous suspensions formed by polymerization of the monomeric materials in aqueous emulsion retain the ability to be subdivided.

In forming the suspension, the vinyl chloride resins are intimately mixed with a relatively non-volatile plasticizer in the proportions of about 60 to 150 parts of plasticizer per 100 parts of resins, together with pigments, stabilizers, powdered filling materials and flameproofing ingredients, if desired. The mixing operations are carried out in suitable equipment, such as a ball mill or a three-roller mill. Suitable plasticizers which are compatible with the vinyl chloride resins include di(2-ethylhexyl) phthalate, dicapryl phthalate, tri(2-ethylhexyl) phosphate, butyl phthalyl butyl glycollate, dibutyl sebacate, di(2-ethylhexyl) succinate, di(2-ethylhexyl) maleate, tricresyl phosphate and the like. The preferred plasticizers are di(2-ethylhexyl) phthalate and tri(2-ethylhexyl) phosphate and these plasticizers may be blended with other plasticizers of more limited compatibility with the resins, such as the butyl ester of acetylated polymerized ricinoleic acid, methyl, ethyl, or butyl acetyl ricinoleate or xylyl heptadecyl ketone, to increase the fluidity of the suspensions. It is believed that the less compatible plasticizers, when blended with plasticizers having a more extensive compatibility, reduce the solvation of the resin particles with a resultant increase in the fluidity of the suspensions. The compatibility of a plasticizer with the vinyl chloride resins may be determined by dissolving the resin and plasticizer in a solvent, such as cyclohexanone, and casting a film from the solvent. A hazy, oily, or crumbly film indicates incompatibility of the plasticizer with the resin in the proportions used. Other incompatible plasticizers or plasticizers of limited compatibility, which may be used as extenders for the more compatible ones, include methyl cyclohexyl stearate, methoxyethyl oleate, acetylated castor oil, acetylated polymerized castor oil, and the methyl ester of polymerized ricinoleic acids.

Plasticizers having a strong solvent action for the resins, such as tricresyl phosphate, are not as desirable as plasticizers, such as di(2-ethylhexyl) phthalate, which have a very slow solvent action on the resins at ordinary temperatures. It has been found that plasticizers of the latter type yield pourable suspensions of greater fluidity than the plasticizers having a strong solvent action at ordinary temperatures.

A small amount (under 3% by weight of the plasticizer) of the relatively insoluble vinyl chloride resin may be initially dissolved in the plasticizer to improve the flow properties of the suspension, and to minimize any tendency of the plasticizer to migrate before the suspension has been hardened by heating. Larger amounts, up to about 10% by weight of the plasticizer, of more soluble resins, such as polymerized butyl methacrylate and copolymers of vinyl chloride with vinyl acetate having an average molecular weight of about 10,000 may be added for this purpose.

The temperature of the grinding operation must be kept low, i. e., below 40° to 50° C., to avoid solvation and swelling of the resin by the plasticizer. The resulting suspensions may be prepared as thick, pasty fluids which may have pseudoplastic flow properties under stress, or they may be made as pourable liquid compositions.

The vinyl chloride resins are customarily stabilized to increase their resistance to heat and any of the materials developed for this purpose may be employed, such as litharge, basic lead carbonate, lead stearate, lead oleate, basic lead sulfate and the like. To increase the flame resistance of the sealing composition, antimony oxide may be added.

Finely divided pigments and filling materials, in addition to the above functions, also serve to improve the texture and the flow qualities of the suspensions. The sealing compositions after hardening, have good insulating qualities and they do not reduce the dielectric qualities of the primary insulation or jacketing material by migration of the plasticizer.

The sealing composition hardens solely by the application of heat and cooling, and no chemical reaction occurs in the process. No solvents or volatile fumes are given off in the process which would result in swelling or bursting of the cable. The temperature at which the heat treatment is carried out is important; it must be sufficiently high to solvate the resin. This usually requires a final temperature of 300° to 375° F., although an initial temperature of about 200° to 250° F. may be employed merely to reduce the plastic flow of the sealing composition, but the composition will not attain a high degree of strength or resilience until after baking at the high temperature. The sealing composition does not have to be maintained at the high temperature for long periods; and usually an exposure to these temperatures for two to five minutes will suffice, due allowance being made for the rate of heat transfer through the cable. The sealing composition may also be applied at various stages throughout the cable making operation, and a final heat treatment may be given the cable to harden the sealing composition throughout the cable.

*Example 1*

The following is an example of a suitable nonflammable sealing composition:

|   | Per cent |
|---|---|
| Copolymer of vinyl chloride with vinyl acetate, made by emulsion polymerization, containing about 92 to 98% vinyl chloride and having an average molecular weight of 22,000 to 25,000 by Staudinger's method * | 35.0 |
| Di(2-ethylhexyl) phthalate | 35.0 |
| Antimony oxide | 10.0 |
| Blue basic lead sulfate | 10.0 |
| Calcium carbonate | 10.0 |
|   | 100.0 |

* See Douglas and Stoops, Ind. & Eng. Chem., volume 28, page 1152 (1936).

The suspension was compounded by pre-grinding all the ingredients except the plasticizer in a pebble-mill for 48 hours. The plasticizer was then added, and the powdery mass was milled in a three-roller mill until a fluid, pasty, finely divided suspension was formed having pseudoplastic flow properties.

This sealing composition is particularly adapted for use with primary insulation and jacketing compositions comprising plasticized highly polymerized vinyl chloride resin of which the following examples are typical:

|   | Example 1a, Primary Insulation | Example 1b, Jacketing Composition |
|---|---|---|
|   | Per cent | Per cent |
| Copolymer of vinyl chloride with vinyl acetate, 95% vinyl chloride | 62.5 | 55 |
| Di(2-ethylhexyl) phthalate | 20.0 | 12 |
| Tricresyl phosphate | 8.5 | 25 |
| Litharge | 2.0 | 5 |
| Carbon black | 2.0 | 2 |
| Mineral oil | 1.0 | 1 |
| White lead | 3.0 |   |
| Fused lead stearate | 1.0 |   |
|   | 100.0 | 100.0 |

*Example 2*

The following suspension was prepared:

|   | Per cent |
|---|---|
| Resin A (vinyl chloride-vinyl acetate copolymer made by emulsion polymerization, av. mol. wt. 30,000, vinyl chloride content 96%, dry ground 24 hours in a pebble mill) | 38.0 |
| Di(2-ethylhexyl) phthalate | 35.0 |
| Antimony oxide | 9.0 |
| Blue basic lead sulfate | 9.0 |
| Calcium carbonate | 9.0 |
| Phthalocyanine blue pigment | trace |
|   | 100.0 |

The above materials were passed through a three-roller mill three times to yield a smooth textured, readily flowable paste, useful for sealing the voids in cables by the methods herein described. Its heat-converting properties were demonstrated by dipping a wire in the suspension, and then baking at 350° F. for two minutes to form a tough, resilient covering. These properties were also illustrated by dipping an asbestos tape in the suspension, and then baking for five minutes at 350° F. The impregnated tape, in unconverted, or partially converted, or converted form, may be used for sealing purposes to wrap bundles of conductors.

*Example 3*

A composition was prepared as follows:

|  | Per cent |
|---|---|
| Resin A | 34.6 |
| Iron oxide pigment, yellow | 5.8 |
| Iron oxide pigment, black | 2.9 |
| Blue basic lead sulfate | 7.7 |
| Calcium carbonate | 14.4 |
| Di(2-ethylhexyl) phthalate | 22.4 |
| Butyl ester of acetylated polymerized ricinoleic acid | 11.2 |
| n-octadecene amide | 1.0 |
|  | 100.0 |

Upon passing the composition through a buhrstone mill several times, an easily spreadable paste resulted.

Eight strands of #18 copper wire were smeared with the paste and the strands twisted together to form a cable. The excess paste was wiped from the outside, then tape was wound around the twisted strands as insulation. The completed cable was baked for five minutes at 360° F.

Upon disassembling part of the cable for examination, it was found that the pasty suspension had been converted into a flexible, tough material by the baking operation, which completely filled the spaces between the individual wires.

Where a seal is desired between the tape and the wires, additional sealing composition may be spread over the wires before the tape is applied.

*Example 4*

The following ingredients were passed four times through a three-roller mill at a temperature below 40° C.:

|  | Percent |
|---|---|
| Resin A | 35 |
| Antimony oxide | 10 |
| Blue basic lead sulfate | 10 |
| Calcium carbonate | 10 |
| 2% solution of Resin A in di(2-ethylhexyl) phthalate | 35 |
|  | 100 |

The resulting sealing composition had a high degree of cohesiveness and exhibited very little tendency for the plasticizer to separate. The solution of the resin in the plasticizer was prepared by heating the ingredients.

*Example 5*

The following pigment dispersion was prepared using a three-roller mill:

|  | Percent |
|---|---|
| Antimony oxide | 40 |
| Basic sulfate white lead | 40 |
| Di(2-ethylhexyl) phthalate | 20 |
|  | 100 |

The pigment dispersion was then mixed with additional plasticizer and resin, and milled on the three-roller mill to obtain a smooth, readily flowable paste suitable for filling the voids in multi-conductor cables.

The ultimate composition was as follows:

|  | Percent |
|---|---|
| Resin A | 40 |
| Di(2-ethylhexyl) phthalate | 35 |
| Antimony oxide | 12.5 |
| Basic sulfate white lead | 12.5 |
|  | 100.0 |

*Example 6*

A pigment dispersion was prepared as follows:

|  | Percent |
|---|---|
| Antimony oxide | 28.5 |
| Blue basic lead sulfate | 28.6 |
| Calcium carbonate | 28.6 |
| Di(2-ethylhexyl) phthalate | 9.5 |
| Butyl ester of acetylated polymerized ricinoleic acid | 4.8 |
|  | 100.0 |

This was compounded on the three-roller mill as follows to obtain a smooth, fluid suspension, suitable as a sealing composition:

|  | Percent |
|---|---|
| Pigment dispersion | 35 |
| Resin A (not ground) | 35 |
| Di(2-ethylhexyl) phthalate | 20 |
| Butyl ester of acetylated polymerized ricinoleic acid | 10 |
|  | 100 |

*Example 7*

The sealing composition may also be clear in appearance. In some instances, this may make it possible to examine the conductors for breaks, without disassembling the cable.

The following composition was prepared:

|  | Percent |
|---|---|
| Resin A | 50 |
| Dibutyl tin dilaurate | 1 |
| Di(2-ethylhexyl) phthalate | 49 |
|  | 100 |

This composition was passed three times through a three-roller mill to produce a somewhat milky paste of easily spreadable consistency.

On heating the paste, it was transformed to a clear elastomer.

It is apparent that the proportions and ingredients shown in the above examples may be varied in accordance with the disclosure herein without departing from the scope of the invention as defined in the appended claim.

We claim:

Method for filling the interstices of a flexible electrical cable containing stranded wires insulated with plasticized vinyl chloride resins which comprises applying to the strands prior to stranding and cabling a pasty fluid suspension having sufficient internal cohesiveness to adhere to the strands composed of a suspension of a finely-divided highly polymerized vinyl chloride resin in from about 60 to 150 parts of a plasticizer per 100 parts of resin, twisting the strands in the presence of said suspension to form stranded elements of said cable having said suspension evenly distributed throughout the interstices of said stranded elements, heating the suspension while so distributed to a temperature of at least about 300° F., and cooling the suspension to form a resilient, flexible solid elastomeric composition of substantially the same volume as the suspension completely filling said interstices so as to prevent the passage of water under a pressure of 25 pounds per square inch therethrough without substantially reducing the flexibility of the cable or the dielectric qualities of the insulation.

GEORGE M. POWELL, 3RD.
JOSEPH E. BRISTER.

REFERENCES CITED

The following references are of record in the file of this patent:

UNITED STATES PATENTS

| Number | Name | Date |
|---|---|---|
| 2,289,732 | Rosch | July 14, 1942 |
| 2,349,412 | Douglas | May 23, 1944 |
| 2,349,413 | Hemperly | May 23, 1944 |
| 2,140,518 | Doolittle | Dec. 20, 1938 |
| 2,127,122 | Lamela | Aug. 16, 1938 |
| 2,118,017 | Safford | May 17, 1938 |
| 2,048,450 | Horn | July 21, 1936 |
| 1,952,191 | Arutunoff | Mar. 27, 1934 |
| 2,185,558 | Lunsford | Jan. 2, 1940 |

FOREIGN PATENTS

| Number | Country | Date |
|---|---|---|
| 500,298 | Great Britain | Feb. 7, 1939 |

OTHER REFERENCES

Ind. & Eng. Chemistry, by Reed, vol. 35 #8, August 1943, pages 896–904.